US007231162B2

(12) United States Patent
Brenner et al.

(10) Patent No.: US 7,231,162 B2
(45) Date of Patent: Jun. 12, 2007

(54) OXYGEN GENERATORS IN INK CARTRIDGE ENVIRONMENT

(75) Inventors: Robert E. Brenner, New Richmond, WI (US); James A. Baker, Hudson, WI (US)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 248 days.

(21) Appl. No.: 10/971,536

(22) Filed: Oct. 22, 2004

(65) Prior Publication Data

US 2006/0088332 A1 Apr. 27, 2006

(51) Int. Cl.
*C03G 21/20* (2006.01)

(52) U.S. Cl. ........................................................ 399/93

(58) Field of Classification Search .................. 399/91, 399/92, 93, 237, 249, 250; 422/109, 288, 422/290

See application file for complete search history.

(56) References Cited

U.S. PATENT DOCUMENTS

| | | | | |
|---|---|---|---|---|
| 3,130,079 | A | 4/1964 | Von Meiser | 399/239 |
| 3,907,423 | A | 9/1975 | Hayashi et al. | 399/249 |
| 4,415,533 | A | 11/1983 | Kurotori | 422/4 |
| 4,760,423 | A * | 7/1988 | Holtje et al. | 399/250 |
| 5,198,195 | A | 3/1993 | Yoda | 422/199 |
| 5,294,406 | A * | 3/1994 | Sekido et al. | 422/109 |
| 5,737,674 | A * | 4/1998 | Venkatesan et al. | 399/250 |
| 6,996,352 | B2 * | 2/2006 | Choi et al. | 399/93 |
| 2004/0146314 | A1 | 7/2004 | Yon et al. | 399/93 |

FOREIGN PATENT DOCUMENTS

JP 2-20894 * 1/1990

* cited by examiner

*Primary Examiner*—Hoan Tran
(74) *Attorney, Agent, or Firm*—Mark A. Litman & Associates, P.A.

(57) ABSTRACT

A system is provided within an electrophotographic imaging environment that removes or decomposes airborne hydrocarbons (as vapor and/or droplets), at least some of which are provided from evaporation or airborne dispersal of hydrocarbon carrier from electrophotographic toners or inks during and imaging process. The system has a catalyst that assists in the oxidation or decomposition of hydrocarbons and a (catalyst and vapor phase) heating and oxygen-providing components including a chemical oxygen-generator. The chemical reaction that occurs in the oxygen generation provides both a) immediate and significant amounts of heat that heats both the catalyst and the gas phase containing the hydrocarbon and the oxygen and b) oxygen to assist in the decomposition and/or oxidation of the hydrocarbon and other airborne materials.

23 Claims, 3 Drawing Sheets

OXYGEN GENERATORS IN INK CARTRIDGE ENVIRONMENT

BACKGROUND OF THE INVENTION

1. Field of the Invention

The present invention relates to the field of toners or inks used in imaging processes, particularly electrophotographic or electrographic imaging processes. The invention also relates to compositions, apparatus and methods for reducing solvent or carrier emission in imaging systems.

2. Background of the Art

Electrophotography is generally classified into wet and dry methods. In the former, a permanent image may be obtained through the steps of forming an electrostatic latent image on an image-bearing element such as a selenium electrophotographic element, a zinc oxide electrophotographic element or the like, developing the thus formed image with a liquid developer, transferring the developed image onto a transfer sheet as occasion demands, and thereafter heating and drying the developed or transferred image by means of a heating means such as heat roller or the like further as occasion demands. In the latter, on the other hand, a permanent image may be obtained through the steps of developing an electrostatic latent image formed in the same manner as described above with a powder developer (toner particles), transferring said image onto a transfer sheet as occasion demands, and thereafter thermally fixing the image by means of a heating means such as heat roller or the like. In addition, a method is also known which is designed to form an electrostatic latent image on an electrostatic recording element (which is also called a dielectric element) in place of an electrophotographic element. In this connection, it is to be noted that the electrophotographic element and electrostatic recording element shall hereinafter be called "an element being developed" respectively.

In the case of the wet method, an odorous solvent vapor-containing exhaust gas is discharged from a wet type electrophotographic machine utilizing this method, because the liquid developer used in the developing step contains a large quantity of solvent consisting essentially of a hydrocarbon, such as a paraffinic or isoparaffinic hydrocarbon. This solvent vapor is caused by evaporation of the solvent attached to the element being developed in the developing step or to the transfer member in the transferring step, but additionally by evaporation of the solvent attached to the developing unit or the like. This generation of solvent vapor is further accelerated when the element being developed or transfer member is heated and dried in a drying step and/or is fused to permanently fix the image to a final receptor by means of a heating means. Even in "dry" toner systems, there is residual solvent (also usually non-polar hydrocarbon solvent) present in the toner that is released by development procedures.

Usually, such a solvent vapor-containing exhaust gas has been discharged to the outside of a machine without undergoing any treatment. Due to this, it has been called into question from the standpoint of environment sanitation that a small, especially confined room is filled with a high concentration of solvent gas in a short time in the cases of operating a machine at a high speed even when ventilating the room as well as operating the machine without ventilating the room. Therefore, various schemes to improve this problem have hitherto been proposed, for instance, (1) the use of a reversing squeeze roller for reducing the quantity of solvent attached to an element being developed and thereby suppressing the quantity of solvent vapor generated in the exhaust gas (which is disclosed, for instance, in U.S. Pat. No. 3,907,423 or German Pat. No. 2,361,833), (2) the introduction of exhaust gas (which has been collected by means of an air duct, this being applicable to the exhaust gas appearing hereinafter) to an adsorbent layer for allowing the gas to adsorb the solvent vapor, (3) the introduction of the exhaust gas into a high boiling solvent likewise for allowing said gas to adsorb the solvent vapor, (4) the passage of the exhaust gas through a condenser for removing a liquidified solvent vapor therefrom (which is disclosed, for instance, in U.S. Pat. No. 3,130,079), (5) the conversion of the solvent vapor contained in exhaust gas into a different substance through the reaction thereof with a reactive substance, and so forth. However, the scheme (1) still involves problems to be solved in image quality, that is, the resulting copy is of deteriorated image density and further the wide image area lacks the uniformity of image, the scheme (2) is defective in that the efficiency of adsorption is low, the scheme (3) is defective in that the efficiency of adsorption is more inferior than that of the scheme (2), the scheme (4) is defective in that the apparatus therefor becomes complicated and large-sized, which leads to high cost, and the scheme (5) has a problem to be solved in that a different odorous substance is created.

In the case of the dry method, on the other hand, an odorous gas is exhausted from an electrophotographic machine, too. The odorous substances contained in this exhaust gas, which are caused when the toner used is thermally fixed, are different in composition from those of the exhaust gas from the wet type electrophotographic machine, and in more detail comprise those generated from the toner particles and the electrophotographic element-constituting materials (various kinds of resins), for instance, such as the residual solvent, unreacted monomer and its decomposition gas and remaining solvent contained in the material resins and additionally those generated from the material constituting the surface of the heat roller (silicone resin), for instance, such as the remaining polymerization catalyst, silicone oil and the like. In either case, it is noted that these odorous substances are generated in a marked degree when using high-speed electrophotographic machines, in particular those wherein flash fixing is employed. To reduce these emissions, techniques such as condensation of the vapor or catalytic conversion of the vapor have been used.

U.S. Published Patent Application 2004/0146314 describes an exhaust system of a liquid electrophotography printer comprising an exhaust line to discharge air inside an engine cell to an outside thereof; at least one exhaust fan, which is installed inside the exhaust line to generate and move the air inside the engine cell; a heating coil to heat the air to be discharged through the exhaust line to ignite impurities contained in the air; and an oxidative catalyst filter to filter and deodorize the impurities.

For example, U.S. Pat. No. 4,415,533 (Kurotori et al.) discloses a process and apparatus for treating exhaust gas from an electrophotographic machine. The odorous exhaust gas is oxidized, in the presence of a heated oxidation catalyst, to make the exhaust gas odorless. The catalyst must be heated so that it may be activated. As the heating system for the catalyst, there may be employed any one of the inside and outside heating systems. It goes without saying that the process according to the present invention is applicable to electrophotographic machines not only having a drying or heat fixing unit but also lacking a drying or heat fixing unit. In case where this machine is a wet type electrophotographic machine, it is preferable that at least a part of the heat for use in heating the catalyst should be utilized for the purpose of drying a copy material leaving the machine because said copy material is still remaining wet. These catalysts, when used, are carried on normal carriers such as alumina, silica, diatom earth, clay and the like. With reference to the configuration of catalysts there is no specific limitation, but the catalysts used are normally of a honey-comb construction.

U.S. Pat. No. 5,198,195 describes a developer treatment apparatus for treating excess developer after development of a film in a development chamber with the developer which contains a solvent composed of a hydrocarbon as a main component and a pigment dispersed in the solvent, the improvement of said developer treatment apparatus comprising: a tank for receiving excess developer, the tank having an opening for receiving an inflow of the excess developer exhausted from the development chamber. There is a passage connected between the development chamber and the tank opening through which excess developer is supplied to the tank after development in the development chamber. A catalyst for oxidizing excess developer received in the tank by converting excess developer into gases made of water vapor and carbon dioxide and discharging the gases. There is a vaporization means for vaporizing excess developer received in the tank and for supplying vapor of the excess developer to the catalyst. There is a catalyst igniting heater for first oxidizing said vaporized excess developer and a system for intermittently supplying new developer to the development chamber. There is also means for supplying electricity to the catalyst igniting heater after the new developer, which has been supplied to the development chamber by the developer supplying means, flows into the tank through the passage and the tank opening, such that the vapor of the excess developer is spontaneously combustible even when the development treatment apparatus, the vaporization means and the catalyst igniting heater are turned off.

A difficulty in the use of this type of catalytic reduction system relates to the fact that the catalyst must be heated (e.g., at least 150 to 400C) to enable decomposition of the carrier vapor, and that the catalyst must be hot when the vapor reaches the catalyst to be effective. If there is a significant delay in the heating, some vapor will pass through the catalytic converting area without being decomposed. It has therefore been suggested that the catalyst be maintained at a high temperature in expectation of the passage of the carrier vapor. This is both expensive (because of energy consumption) and potentially dangerous (by maintaining a very hot element within the machine).

SUMMARY OF THE INVENTION

A system is provided within an electrophotographic imaging environment that removes or decomposes airborne hydrocarbons (as vapor and/or droplets), at least some of which are provided from evaporation or airborne dispersal of hydrocarbon carrier from electrophotographic toners or inks during and imaging process. The system comprises a catalyst that assists in the oxidation or decomposition of hydrocarbons and (catalyst and vapor phase) heating and oxygen-providing components comprising a chemical oxygen-generator. The chemical reaction that occurs in the oxygen generation provides both a) immediate and significant amounts of heat that heats both the catalyst and the gas phase containing the hydrocarbon and the oxygen and b) oxygen to assist in the decomposition and/or oxidation of the hydrocarbon and other airborne materials.

DETAILED DESCRIPTION OF THE INVENTION

Figure 1:
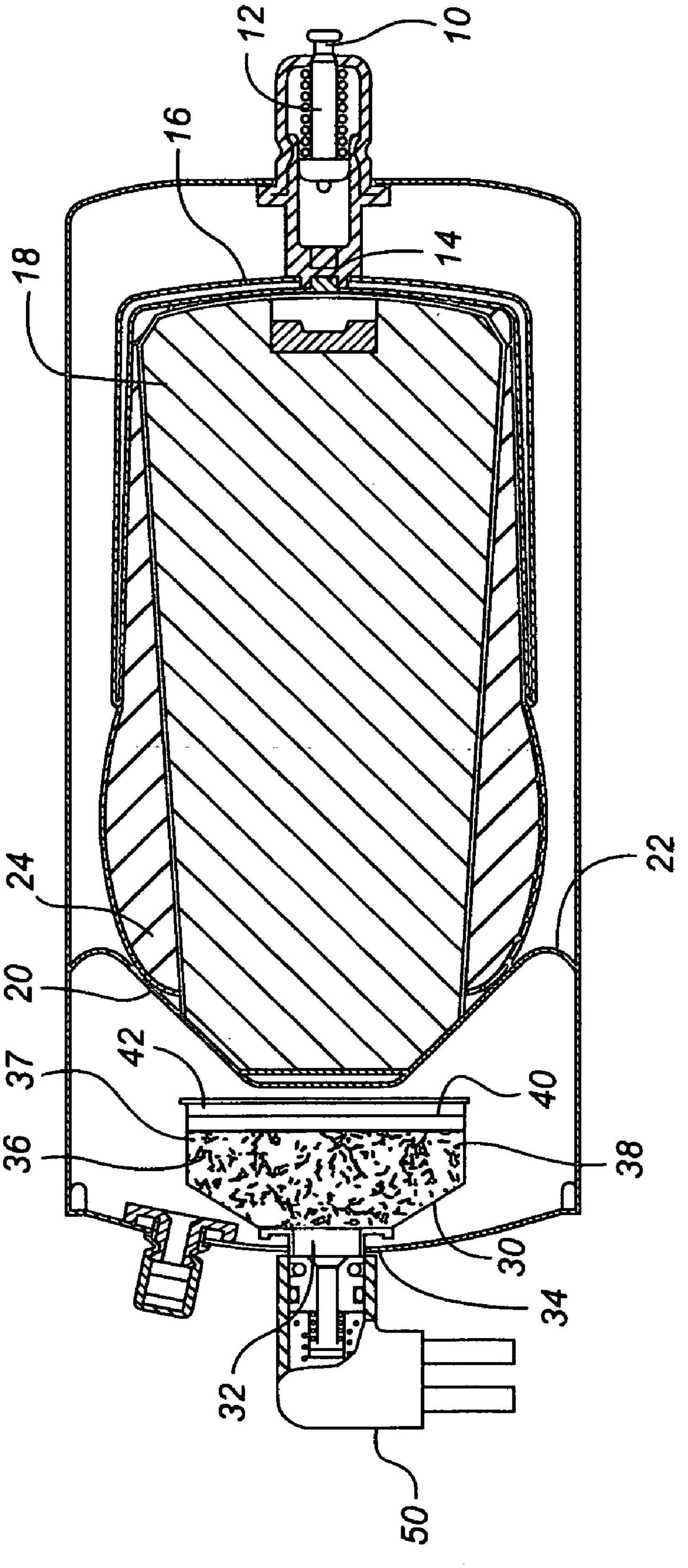
FIG. 1 shows a chemical oxygen generating system that can be modified to provide heat and oxygen to a vapor control system in an electrophotographic environment.

An electrographic or electrophotographic imaging system comprises an imaging area; a source of liquid ink comprising a hydrocarbon carrier; a vapor transportation system that transports a gas medium; and a catalytic hydrocarbon-decomposition zone receiving the gas medium; wherein the catalytic hydrocarbon-decomposition zone comprises a catalytic converter and a chemical oxygen generation system that heats the catalytic converter and provides oxygen to the hydrocarbon-decomposition zone. There is significant heat provided by many chemical oxygen generation systems that are known in the art. In addition to being able to provide significant amounts of heat that rapidly bring the catalytic converter temperature (and the temperature of a gas environment containing hydrocarbons as vapor or droplets) up to temperatures that accelerate the oxidation or decomposition process of the catalytic converter, the chemical oxygen generation process provides oxygen that can be used to react with the hydrocarbon and any other unwanted materials in the gas volume.

The chemical oxygen generation system may use any oxygen generating reagents, although those that contain a chlorate or perchlorate are preferred. The oxygen generation system may provide in batch form a reagent that provides oxygen in the chemical oxygen generation system. The system may provide the reagent in batch form on demand by the chemical oxygen generation system. The system may have demand triggered by a characteristic of use of the imaging system, such as, by way of non-limiting examples, at least one signal indicating at least one of turning on apparatus that performs the imaging process; initiation of an imaging step; gas flow into, within or from the imaging process; sensing of hydrocarbons in a gas volume; and user input. The actual amount and time of heating of the catalytic converter may be triggered or controlled by controlling at least one of time of chemical oxygen generation and volume of material used in chemical oxygen generation. For example, heating may be controlled by controlling contact time of a chemical oxygen reagent within an igniter. The contact time may be controlled by use of a plunger that moves chemical oxygen reagent into and away from contact with an igniter. It is also possible to provide pellets or wafers with the igniter material contained in or on the pellet so that compression of the pellet will provide sufficiently intimate or rigorous contact as to auto-ignite the pellet or wafer, which will then burn itself out after exhaustion of the reagents.

A method of decomposing hydrocarbon in a gas volume may comprise: providing hydrocarbon in a gas volume to a catalytic converter; and heating at least the catalytic converter by performing a chemical oxygen generation process so that heat from the chemical oxygen generation process heats the catalytic converter. The method may have the gas volume provided from an electrographic or electrophotographic imaging process, especially where the electrographic or electrophotographic imaging process uses a liquid ink comprising hydrocarbon carrier. Initiation of a chemical oxygen generation process may occur upon demand by at least one signal indicating at least one of turning on apparatus that performs the imaging process; initiation of an imaging step; gas flow into, within or from the imaging process; sensing of hydrocarbons in a gas volume; and user input.

Chemical oxygen generators are typically used in situations requiring emergency supplemental oxygen, such as in aviation, during decompression, in mine rescue operations, in submarines, and in other similar settings. Chemical oxygen generating compositions based upon the decomposition of alkali metal chlorates or perchlorates have long been used as an emergency source of breathable oxygen, such as in passenger aircraft, for example. Oxygen for such purposes must be of suitably purity. For example, the requirements of SAE Aerospace Standard AS8010C are frequently applicable to oxygen used for breathing in aviation applications.

A typical chemical oxygen generating candle may have several layers with different compositions to obtain different reaction rates and flow rates which are desired at different stages during the period of operation. The candle typically has a generally cylindrical shape with a taper, with a recess at one end to hold an ignition pellet. The ignition pellet is ignited by firing a primer, and heat from the ignition pellet then ignites the reaction of the candle body, generating oxygen.

Chemical oxygen generators commonly utilize sodium chlorate, potassium perchlorate, and lithium perchlorate as sources of oxygen. Upon decomposition, the chlorate or perchlorate releases oxygen. In a typical chemical oxygen generator, a sodium chlorate candle is encased in a stainless steel canister, and oxygen is generated by decomposition of sodium chlorate in the presence of a commonly used fuel, such as iron powder, to provide extra heat to sustain the decomposition. Up to several hundred parts per million (ppm) chlorine gas is typically produced along with the oxygen, through side reactions and some organic contamination. The chlorine may be separately filtered out (e.g., chlorine specific absorbent, activated charcoal, or the like) or may be reacted with metal particles provided in the environment.

Iron powder typically contains 0.02% to 1% carbon that can also contaminate the oxygen released with up to 1,000 ppm of carbon monoxide. Above 710° C., thermodynamic constraints also favor carbon monoxide formation over formation of $CO_2$. Since iron is a very energetic fuel, and loading can be relatively high in some portions of the candle, temperatures in excess of 710° C. can easily be reached. Even after oxygen evolution has ceased in those sections of the candle, temperatures typically continue to rise due to the oxidizing environment that is produced that can increase the extent of oxidation of iron. Thus, high levels of carbon monoxide in the oxygen produced by the initial stages of a candle fueled by carbon-containing metal powders such as iron are common, so that both chlorine gas and carbon monoxide must be removed to provide a safely breathable gas. The percussion primer, commonly used as an actuating means, contains organic compounds which can be a source of carbon monoxide. Electrical squibbs can also produce carbon monoxide. Thus, some carbon monoxide can be a contaminant of the liberated oxygen, even when steps are taken to reduce or eliminate carbon content in other materials used. Currently typically no more than 0.2 ppm chlorine and 15 to 50 ppm carbon monoxide is allowed in the oxygen provided for aviation.

Granular hopcalite bed filters and activated carbon filters are also used in some chemical oxygen generators for removing carbon monoxide, and are generally packed in a filter bed at the outlet end inside of the generators. The granules typically have a particle size between 10 and 20 mesh.

FIG. 1, when pin 10 of a chemical oxygen generator is pulled out, striker 12 hits the primer 14, and flame from the primer in turn ignites the ignition pellet 16. The resultant heat from the ignition pellet initiates the decomposition reaction of the chemical core 18, generating oxygen typically containing a few hundred ppm of carbon monoxide and chlorine gas. The oxygen, carbon monoxide and chlorine gas flow through the holes 22 at the trough 24 of a core retainer 20 through filter 30 to an outlet valve 50. The lithium hydroxide coated hopcalite 36, the active filtering material, is contained in a filter housing, preferably formed by a stainless steel cup 37, between a wire screen 32 supporting a particulate filter 34 and a particulate filter pad 38 to retain the filter material. Wire screen 40 supports the particulate filter pad, and the wire screen is secured by a retention ring 42 to the filter housing. Filtered oxygen that has passed through the filter generally has less than 0.2 ppm chlorine and less than 10 ppm carbon monoxide. The chemical core 18 may be provided in solid segments (such as wafers, discs, or the like) which can be ignited for short periods of time, or can be provided as powder that can be fed in small amounts in batch or semi-continuous basis into a reaction zone that is ignited by the ignition pellet or other ignition system. The core may also be provided in direct contact with the catalytic converter so that heat generated by the decomposition will be directly conducted to the catalyst.

One other possible source of oxygen and heat is an oxygen-generating candle which produces oxygen upon ignition and decomposition of the candle. One such candle includes an oxygen source such as sodium chlorate, a metal powder fuel such as manganese, and an additive to suppress residual chlorine such as calcium hydroxide. See for example, U.S. Pat. No. 5,338,516, herein incorporated by reference. All references cited herein are incorporated by reference.

U.S. Pat. No. 6,352,652 describes an oxygen generating composition that may be used within the scope of the presently described technology for producing a breathable oxygen gas upon ignition of the composition, comprising about 0.5–15% by weight of a substantially carbon-free metal powder as a fuel; from about 0.1% to about 15% by weight of a transition metal oxide catalyst; about 0.1–20% by weight of an alkali metal silicate, alkali metal stannate, alkali metal titanate or alkali metal zirconate or combinations thereof as a reaction rate and core rheology modifier and chlorine suppresser. The remainder substantially comprises an oxygen source selected from the group consisting of alkali metal chlorates, alkali metal perchlorates, and mixtures thereof. The oxygen generating composition may comprise an alkali metal chlorate or perchlorate, or mixture thereof, as an oxygen source; 0.1 to 15% by weight of a transition metal oxide as a catalyst; a metal powder as a fuel, selected from the group consisting of tin, titanium, and mixtures thereof; and from 0.1 to 20% by weight of an additive selected from alkali metal silicate, alkali metal stannate, alkali metal titanate, alkali metal zirconate, and mixtures thereof as a reaction rate modifier, core rheology modifier and chlorine suppresser.

U.S. Pat. Nos. 6,264,896 and 6,193,097 describe an oxygen generating system comprising, for example, chlorate/perchlorate based oxygen generating compositions contain about 0.5–15% by weight of metal powder for use as a fuel selected from the group consisting of iron, nickel, cobalt and mixtures thereof; about 0.1% to about 15% by weight of at least one transition metal oxide catalyst; greater than 5% to about 25% by weight of an alkali metal silicate as a reaction rate and core rheology modifier, binder and chlorine suppresser; and the remainder substantially comprising an oxygen source selected from the group consisting of alkali metal chlorates, alkali metal perchlorates, and mixtures thereof. The alkali metal silicate can be selected from the group consisting of sodium metasilicate, sodium orthosilicate, lithium metasilicate, potassium silicate, and mixtures thereof. The oxygen generating composition can also optionally contain a binder selected from the group consisting of glass powder, fiber glass and mixtures thereof.

Within the printing environment (that is in a region where the solvent passes through an area where the decomposition of the solvent can be controlled and effected by the use of the technology described herein), the use of the oxygen generating technology both rapidly heats the catalyst (especially difficult where it is a high specific heat ceramic catalyst, which is difficult to heat quickly because of its relatively high heat capacity and mass) and provides an oxygen rich environment where the solvent can be more readily decomposed or oxidized to less odorous or less annoying materials.

The catalysts for use in decomposing the carrier vapor may be any catalyst known in the art for that purpose. Examples of such catalysts are ceramic catalysts, including, but not limited to oxidation catalysts including but not limited to $Mn_2O_3$—$Co_3O_4$, $Mn_2O_3$—NiO, $Mn_2O_3$—$Fe_2O_3$, $Mn_2O_3$—CuO, $Mn_2O_3$—ZnO, NiO-γ-$Al_2O_3$, NiO—$SiO_2$, $NiO_2$—$SiO_2$, $V_2O_3$—$Al_2O_3$, $Cr_2O_3$-γ-$Al_2O_3$, $Cr_3O_4$-γ-$Al_2O_3$, $Co_3O_4$-γ-$Al_2O_3$, $Mn_2O_3$-γ-$Al_2O_3$, Pt-γ-$Al_2O_3$, NiO—$Cr_2O_3$, ZnO—$Cr_2O_3$, $Co_3O_4$—CuO, Pd-γ-$Al_2O_3$, $Cu_3Cr_2O_5$-γ-$Al_2O_3$,NiO—Pd, $Co_3O_4$, $Mn_2O_3$, $Cr_2O_3$, NiO, $Fe_2O_3$, $TiO_2$, $MoO_2$, PbO, ZnO, etc. These catalysts, when used, are carried on normal carriers such as alumina, silica, diatom earth, clay and the like. With reference to the configuration of catalysts there is no specific limitation, but the catalysts used are normally of a honey-comb construction.

Figure 2:
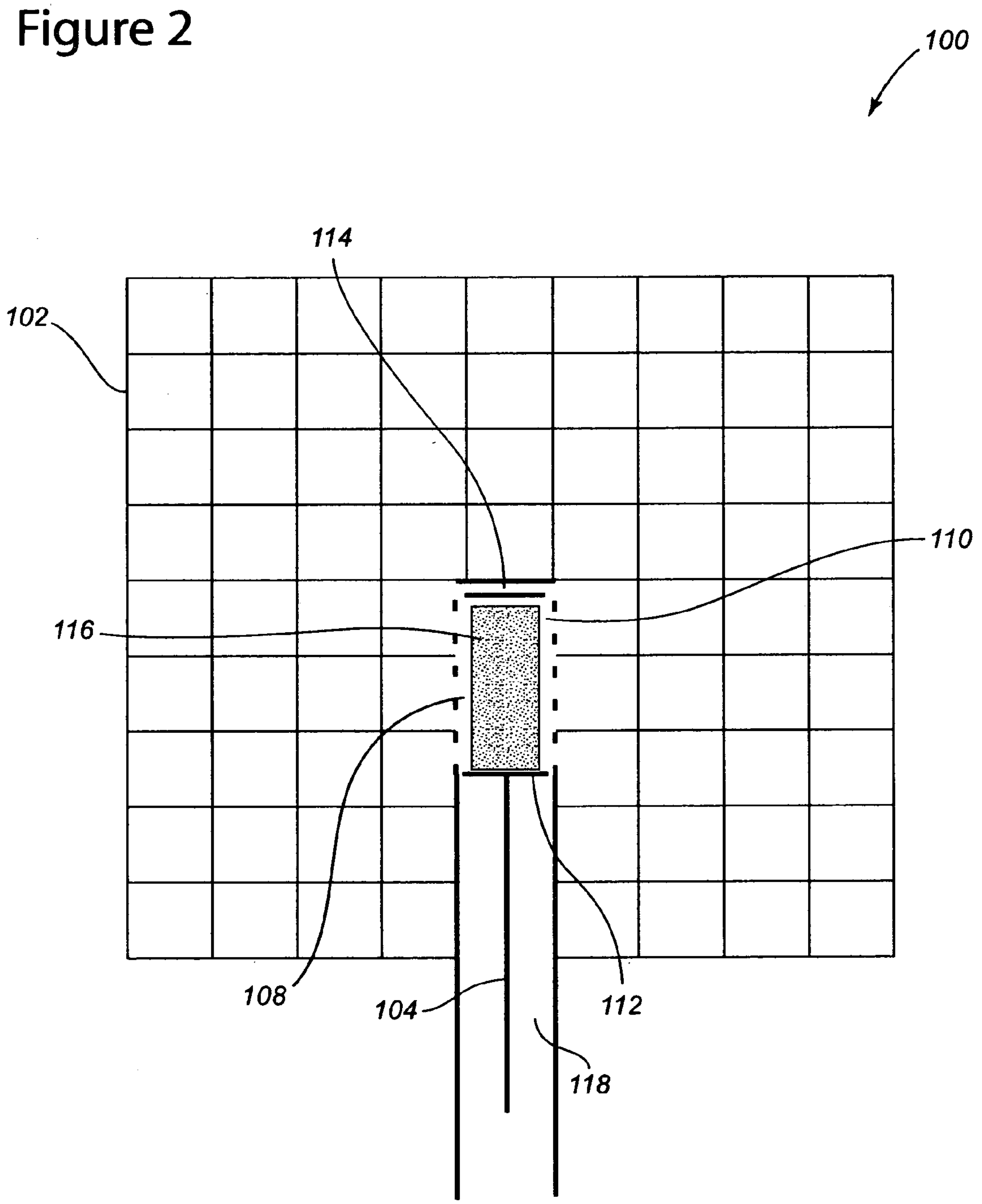
FIG. 2 shows a cutaway view of a schematic of a catalytic converter and heating/oxygen generation system.

FIG. 2 shows a cutaway view of a schematic of a combined catalytic converter and heating/oxygen generation system 100. A catalytic converter 102 is provided with an integral (intimately conductively or convectively communicating) chemical oxygen generation system 106. An oxygen generating reagent pellet 116 (e.g., with a preferred chlorate or perchlorate composition) is provided to or within the chemical oxygen generation system 100, and may be driven by a plunger system 112 in contact with the pellet 116. The contact should be neutral in that the plunger system 112 does not ignite the pellet 116. The pellet can move freely within the extra space 108 within the chemical oxygen generation system 100. The plunger system 112 can (e.g., upon demand or system turn on) advance the pellet 116 into contact with an igniter plate 114 that ignited the pellet and causes oxygen generation and exothermic heat generation to initiate. The oxygen generation and heat generation can be controlled by controlling the length of time that the pellet 116 is being ignited and the reaction continues. In some systems, where the only second reagent is provided by a contact plate 114 (rather than being releasable contained within the pellet), removal of reaction providing conditions (e.g., contact with plate 114, build-up or residue between pellet 116 and plate 114, etc.) can terminate the oxygen releasing heat generating process. In that manner, the heat can be provided on system demand. For example, electrophotographic copiers may go through periods of low activity, inactivity or high activity, and the reaction should be accordingly controlled, as indicated above, by automated, processor driven, system demands. The plunger system 112 may press the pellet 116 forward upon positive demand or withdraw it upon negative demand or end of demand for heat and oxygen generation. Additionally, the shaft 104 of the plunger system 112 can be rotated to remove residue from the reacted surface of the pellet 116, allowing the residue to drop away from the contact area between the pellet 116 and the ignition plate 114, and pass through the open space 118 within the oxygen system 100. Hot gases resulting from the chemical reaction occurring in the oxygen generation can pass through vents 110 to assist in rapidly heating the catalyst system 102.

Figure 3:
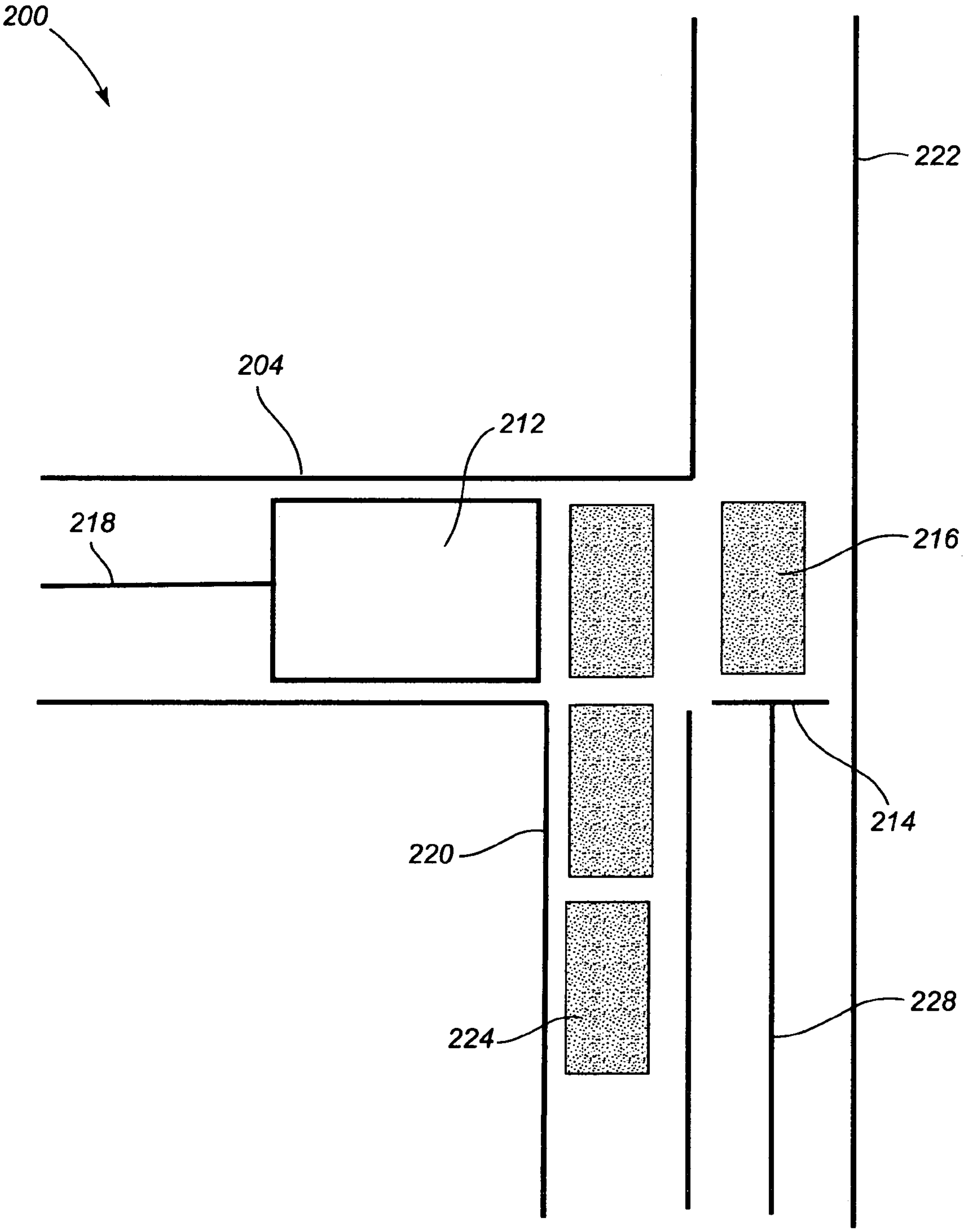
FIG. 3 shows a cutaway schematic of a supply system for materials used in the hydrocarbon oxidation/decomposition system of the presently described technology.

FIG. 3 shows a cutaway schematic of a supply system for materials used in the hydrocarbon oxidation/decomposition system of the presently described technology. This shows an on-demand construction for the chemical oxygen generation system 200. The system 200 provides a plunger assembly 204 with an inert plunger 212 (which may be active to initiate the reaction earlier) and a plunger shaft 218. A supply of pellets or wafers 224 are provided from within a, for example, spring-driven storage tube 220. Individual pellets such as 216 are pushed by the plunger assembly 204 into conveyance tube 222 that carries the pellet or the heated gas from a pellet 216 activated by an igniter plate 214 on a second plunger stem 228. If the plate 214 is not an igniter plate, but is inert, the plate 214 would drive the individual pellet or wafer 216 through tube 222 into contact with an igniter system to initiate the chemical oxygen generation system 200.

Although specific examples of structures and materials have been provided in the above description, the specific disclosure is not intended to limit the generic concepts disclosed and enabled in consideration of the disclosure as a whole. Any imaging process that uses hydrocarbon solvents or carriers may be used in the practice of this technology, even though electrographic and electrophotographic imaging systems have been emphasized.

What is claimed is:

1. An electrographic or electrophotographic imaging system comprising:

an imaging area;

a source of liquid ink comprising a hydrocarbon carrier;

a vapor transportation system that transports a gas medium; and a catalytic hydrocarbon-decomposition zone receiving the gas medium;

wherein the catalytic hydrocarbon-decomposition zone comprises a catalytic converter and a chemical oxygen generation system that heats the catalytic converter and provides oxygen to the hydrocarbon-decomposition zone.

2. The system of claim 1 wherein the chemical oxygen generation system contains a chlorate or perchlorate.

3. The system of claim 2 wherein the chlorate or perchlorate comprises at least one salt selected from the group consisting of sodium chlorate, sodium perchlorate, potassium chlorate and potassium perchlorate.

4. The system of claim 1 wherein the oxygen generation system provides in batch form a reagent that provides oxygen in the chemical oxygen generation system.

5. The system of claim 4 wherein the reagent is provided in batch form on demand by the chemical oxygen generation system.

6. The system of claim 5 wherein demand is triggered by a characteristic of use of the imaging system.

7. The system of claim 1 wherein heating of the catalytic converter is controlled by controlling at least one of time of chemical oxygen generation and volume of material used in chemical oxygen generation.

8. The system of claim 7 heating is controlled by controlling contact time of a chemical oxygen reagent within an igniter.

9. The system of claim 8 wherein contact time is controlled by use of a plunger that moves chemical oxygen reagent into and away from contact with the igniter.

10. The system of claim 1 wherein the chemical oxygen generation system comprises a solid pellet or wafer comprising both an oxygen generating reagent and an igniter so that the solid pellet or wafer can be compressed within the system to autoignite.

11. A method of decomposing hydrocarbon in a gas volume comprising:

providing hydrocarbon in a gas volume to a catalytic converter;

heating at least the catalytic converter by performing a chemical oxygen generation process so that heat from the chemical oxygen generation process heats the catalytic converter.

12. The method of claim 10 wherein the gas volume is provided from an electrographic or electrophotographic imaging process.

13. The method of claim 12 wherein the electrographic or electrophotographic imaging process uses a liquid ink comprising hydrocarbon carrier.

14. The method of claim 13 wherein initiation of a chemical oxygen generation process occurs upon demand by signal indicating at least one of turning on apparatus that performs the imaging process; initiation of an imaging step; gas flow into, within or from the imaging process; sensing of hydrocarbons in a gas volume; and user input.

15. The method of claim 11 wherein the chemical oxygen generation process is performed with a chlorate or perchlorate reagent.

16. The method of claim 15 wherein the chemical oxygen generation process is performed with a reagent selected from the group consisting of an alkali metal chlorate and alkali metal perchlorate.

17. The method of claim 16 wherein reagent is provided in solid form.

18. The method of claim 17 wherein the reagent is provided as a tablet, disc or powder.

19. The method of claim 18 wherein the reagent is provided on automatic demand.

20. The method of claim 19 wherein automatic demand is provided by at least one signal indicating at least one of turning on apparatus that performs an imaging process, initiation of an imaging step, gas flow within or from an imaging process, sensing of hydrocarbons in a gas volume, and imaging process user input.

21. The method of claim 15 wherein the chemical oxygen generation process is initiated by contacting a chemical oxygen generation reagent with an igniter.

22. The method of claim 21 wherein the contacting is effected by bringing a pellet or wafer of the chemical oxygen generation reagent into contact with a distinct igniter material.

23. The method of claim 21 wherein the contacting is effected by compressing a pellet or wafer comprising the chemical oxygen generation reagent and an igniter material to auto-ignite the pellet or wafer.

* * * * *